(12) United States Patent
Zhou

(10) Patent No.: US 9,519,169 B2
(45) Date of Patent: Dec. 13, 2016

(54) LIQUID CRYSTAL DISPLAY DEVICE, CONFIGURATIONAL STRUCTURE OF FRONT FRAME AND MIDDLE FRAME THEREOF

(71) Applicant: Shenzhen China Star Optoelectronics Technology Co., Ltd., Shenzhen, Guangdong (CN)

(72) Inventor: Gege Zhou, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 626 days.

(21) Appl. No.: 13/980,045

(22) PCT Filed: Jun. 27, 2013

(86) PCT No.: PCT/CN2013/078186
§ 371 (c)(1),
(2) Date: Jul. 16, 2013

(87) PCT Pub. No.: WO2014/172999
PCT Pub. Date: Oct. 30, 2014

(65) Prior Publication Data
US 2015/0370118 A1  Dec. 24, 2015

(30) Foreign Application Priority Data

Apr. 25, 2013 (CN) .......................... 2013 1 0147734

(51) Int. Cl.
*G02F 1/1333* (2006.01)
*F21V 8/00* (2006.01)

(52) U.S. Cl.
CPC ....... *G02F 1/133308* (2013.01); *G02B 6/0081* (2013.01); *G02F 2001/13332* (2013.01); *G02F 2001/133317* (2013.01)

(58) Field of Classification Search
CPC .............. G02F 1/133308; G02F 2001/133322; G02F 2001/133317; G02B 6/0081
See application file for complete search history.

(56) References Cited

U.S. PATENT DOCUMENTS

| | | | |
|---|---|---|---|
| 2009/0237586 A1* | 9/2009 | Han | G02F 1/133308 349/58 |
| 2010/0188597 A1* | 7/2010 | Koike | G02F 1/133308 349/58 |
| 2013/0155717 A1* | 6/2013 | Jeong | G02F 1/133308 362/602 |

FOREIGN PATENT DOCUMENTS

| CN | 102867461 A | 1/2013 |
|---|---|---|
| CN | 103033961 A | 4/2013 |

* cited by examiner

*Primary Examiner* — Nathanael R Briggs
(74) *Attorney, Agent, or Firm* — Andrew C. Cheng

(57) ABSTRACT

The present invention discloses a configuration structure for a front frame and a middle frame for use in a liquid crystal display device, and includes a front frame including a sidewall with a first tab and a first notch alternatively arranged. A middle frame is arranged with respect to the front frame, and includes a sidewall having a second notch corresponding to the first tab, and a second tab corresponding to the first notch, alternatively arranged; and wherein the first tab engages with the second notch, and the second tab engages with the first notch so as to securely interlock the front frame and the middle frame. The thickness made up by the sidewall of the front frame and the gap between the front frame and the middle frame is properly reduced, and this can effectively benefit the narrow-border of the liquid crystal display device. In addition, since the backboard is still there without being compromised, the overall mechanic strength of the liquid crystal display is greatly enhanced. On the other hand, since the sidewall of the front frame is directly in connection with the sidewall of the backboard on which the (Continued)

light source is mounted, the front frame can be properly served as a heatsink so as to improve the overall heat dissipation of the liquid crystal display device. The present invention further provides a liquid crystal display device incorporated with such a configurational structure.

15 Claims, 2 Drawing Sheets

LIQUID CRYSTAL DISPLAY DEVICE, CONFIGURATIONAL STRUCTURE OF FRONT FRAME AND MIDDLE FRAME THEREOF

FIELD OF THE INVENTION

The present invention relates to a technologic field of liquid crystal display, and more particularly, to a liquid crystal display device, and a configurational structure of a front frame and a middle frame incorporated thereof.

DESCRIPTION OF PRIOR ART

The liquid crystal display is characteristic features of light, slim and low energy consumption, etc., and it has been widely accepted and used in all kinds of electronic devices. Currently, the existing liquid crystal display device is generally incorporated with a backlight module. This typical liquid crystal display generally includes a backlight module, a liquid crystal panel, and a frame. The frame can be securely attached to the backlight module so as to firmly position the liquid crystal panel to the backlight module. The backlight module provides a homogeneously distributed light source across the liquid crystal panel so as to display those intended images and patterns thereof.

However, with the development of the liquid crystal display, display with narrow-border has become a commanding trend, specially in the design of large dimension, high-resolution liquid crystal display. It is a must. Currently, two commercially available measurements have been used to fulfill the narrow-border design of the panel. The first measurement is to remove the backboard within the backlight module. However, removal of the backboard will compromise the mechanic strength of the overall backlight module and consequently, some side and negative effects will be encountered. The second measurement is to narrow the middle frame. However, narrowing the middle frame has its inherited limitation, and it can hardly meet the requirements from the market.

SUMMARY OF THE INVENTION

In order to resolve the technical problem encountered by the prior art, the purpose of the present invention is to provide a liquid crystal display device, and a configuration of a front frame and a middle frame of a backlight module incorporated therein.

According to one aspect of the present invention, it provides a configuration structure for a front frame and a middle frame for use in a liquid crystal display device, and includes a front frame including a sidewall with a first tab and a first notch alternatively arranged. A middle frame is arranged with respect to the front frame, and includes a sidewall having a second notch corresponding to the first tab, and a second tab corresponding to the first notch, alternatively arranged; and wherein the first tab engages with the second notch, and the second tab engages with the first notch so as to securely interlock the front frame and the middle frame.

In addition, wherein a sidewall of the middle includes at least a retaining slot to receive a corresponding third tab located on a sidewall of a backboard of the liquid crystal display device so as to interlock the backboard and the middle frame.

In addition, wherein the middle frame is made from plastic material.

According to one aspect of the present invention, it provides a liquid crystal display device and includes a backboard defining a receiving space. An optical board is disposed within the space. At least a light source is disposed adjacent to the optical board. At least an optical film is disposed onto an exit surface of the optical board. A middle frame is attached to the backboard so as to securely retain the optical board, the light source and the optical film within the receiving space, wherein a sidewall of the middle frame a second notch corresponding to the first tab, and a second tab corresponding to the first notch, alternatively arranged. A liquid crystal panel is disposed onto the middle frame. A front frame is arranged corresponding to the middle frame and includes a sidewall with a first tab and a first notch alternatively arranged; and wherein the first tab engages with the second notch, and the second tab engages with the first notch so as to securely interlock the front frame and the middle frame thereby firmly positioning the liquid crystal panel.

In addition, wherein a sidewall of the middle includes at least a retaining slot to receive a corresponding third tab located on a sidewall of a backboard of the liquid crystal display device so as to interlock the backboard and the middle frame.

In addition, the light source is a light emitting diode.

In addition, the optical board is a waveguide or a diffuser.

In addition, the optical film is a diffuser, a prism or an enhancer.

In addition, the middle frame is made from plastic material.

By the configurational structure of the front frame and the middle frame made accordance with the present invention, the thickness made up by the sidewall of the front frame and the gap between the front frame and the middle frame is properly reduced, and this can effectively benefit the narrow-border of the liquid crystal display device. In addition, since the backboard is still there without being compromised, the overall mechanic strength of the liquid crystal display is greatly enhanced. On the other hand, since the sidewall of the front frame is directly in connection with the sidewall of the backboard on which the light source is mounted, the front frame can be properly served as a heatsink so as to improve the overall heat dissipation of the liquid crystal display device.

DETAILED DESCRIPTION OF PREFERRED EMBODIMENT

In the description given to the preferred embodiment in view of the accompanied drawings, like elements will be given with similar numeral references.

Detailed description will be given to the embodiment in light of the accompanied drawings. In the description given below, in order to avoid any confusion resulted from the unnecessary description to any configurational structure or function of prior arts, those description in view of the prior art configuration and function has been omitted.

Figure 1:
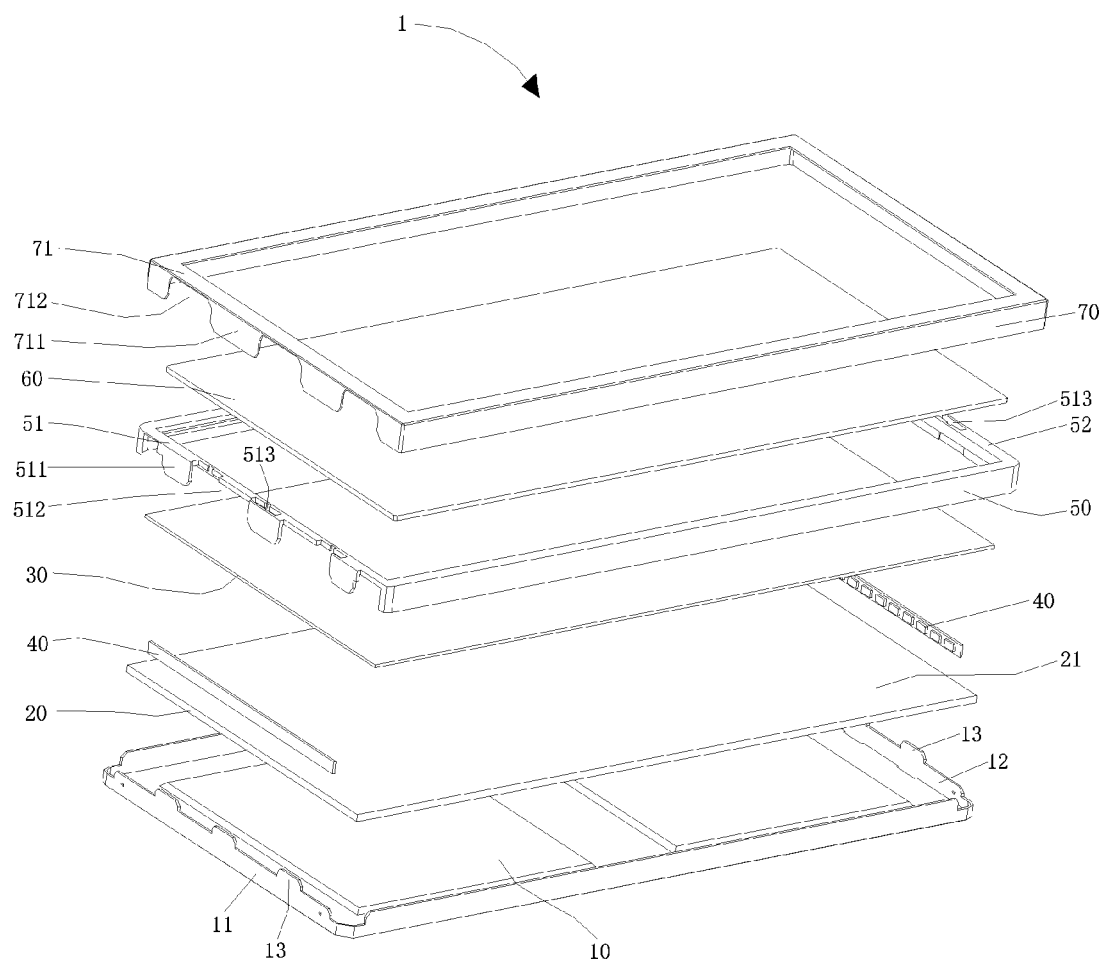
FIG. 1 is an exploded perspective view of a liquid crystal display device made in accordance with the present invention.
Figure 2:
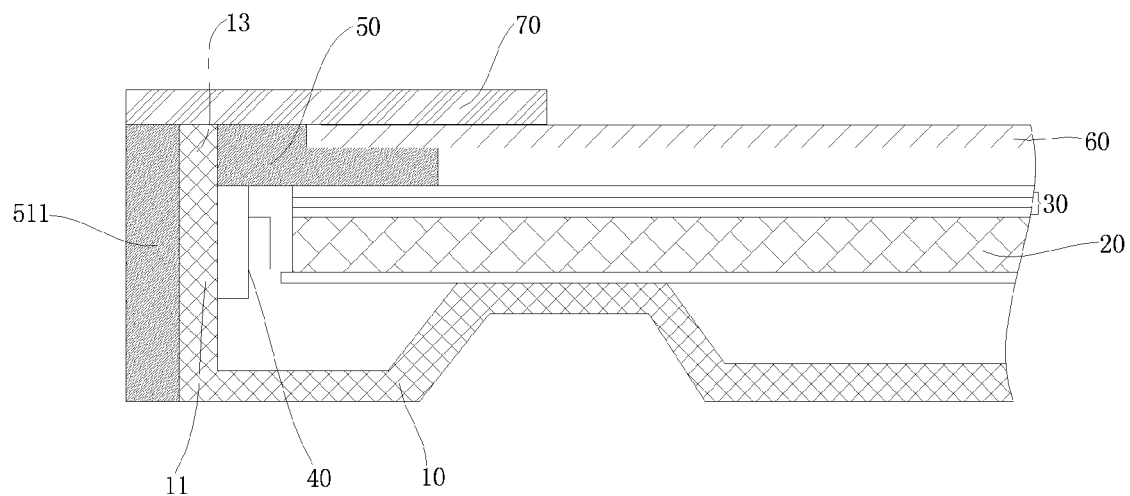
FIG. 2 is a partial, cross-sectional view of the liquid crystal display device made in accordance with the present invention.

FIG. 1 is an exploded perspective view of a liquid crystal display device made in accordance with the present invention; and FIG. 2 is a partial, cross-sectional view of the liquid crystal display device made in accordance with the present invention.

Referring to FIGS. 1 and 2, a liquid crystal display device 1 made in accordance with the present invention includes a backboard 10, an optical board 20, an optical film 30, a light source 40, a middle frame 60 and a front frame 70.

The backboard 10 includes four sidewalls which jointly define a receiving space. Wherein two opposite sidewalls 11, 12 are each provided with a third tab 13. In the current embodiment, the number of the third tab 13 of the sidewalls 11, 12 of the backboard 10 are three. However, it should not be limited thereto as the number can readily be modified according to the field requirements. In addition, the backboard 10 is made from magnesium alloy, aluminum alloy or magnesium aluminum alloy.

The optical board 20 is disposed within the receiving space. In the current embodiment, the optical board 20 can be a waveguide, and which can be made from ploymethyl methacrylate, i.e. PMMA so as to evenly distribute the light beam from the light source 40 to the exit surface 21 thereof. As a result, the light coming out of the exit surface 21 can be evenly projected to the liquid crystal panel 60. However, the present invention should not be limited to this. For example, the light source 40 can be arranged between the backboard 10 and the optical board 20 which can be implemented as a diffuser.

The light source 40 can be implemented as a light strip configured with a plurality of light emitting diodes (LED). However, the present invention should not be limited thereto. For example, the light source 40 can be implemented by a cold-cathode fluorescent lamp (CCFL), or an electroluminescence (EL). In the current embodiment, those two light sources 40 can be mounted onto the sidewalls 11, 12 of the backboard 10 respectively, i.e. those two light sources 40 are closely arranged to the opposite ends of the optical board 20. However, the present invention should not be limited thereto. For example, only one light source 40 is implemented, and it is located on one end of the optical board 20. Alternatively, a plurality of light sources 40 can be disposed between the backboard 10 and the optical board 20.

The optical film 30 is deployed over the exit surface 21 of the optical board 20 so as to further improve the brightness, evenness of the light emitted therefrom.

In the current embodiment, there are three sheets of optical films 30, i.e. a lower diffuser, an enhancer, and a prism or an upper diffuser.

The middle frame 50 includes four sidewalls and one of the sidewall 51, for illustration, includes a second tab 511 and a second notch 512, alternatively arranged across the sidewall 51. In the current embodiment, the number of the second tab 511 is three, and the number of the second notches 512 is four. It should be readily understood that the number of the second tab 511 and the second notch 512 is not merely limited thereto, while it can be readily modified according to the field requirements. In addition, in the present invention, any one or two or three or four of the sidewalls 51 of the middle frame 50, can be provided with the second tab 511 and the second notch 512. In the present invention, the middle frame 50 is made from plastic material.

On the other hand, the opposite sidewalls 51, 52 are each defined with a retaining slot 513. In the current embodiment, the number of the retaining slot 513 on both the sidewalls 51, 52 are three. However, the present invention should not be limited thereto. During the assembling, the opposite sidewalls 51, 52 of the middle frame 50 are facing toward the sidewalls 11, 12 of the backboard 10 such that the third tabs 13 of the sidewalls 11, 12 of the backboard 10 are snugly inserted into the retaining slots 513 of the sidewalls 51, 52, respectively. With the interengagement between the third tabs 13 and the retaining slots 513, the middle frame 50 and the backboard 10 are securely interlocked together. By this arrangement, the optical board 20, the optical film 30, and the light source 40 are securely positioned receiving space of the backboard 10.

The liquid crystal panel 60 is disposed on top of the middle frame 50 so as to be lit up by the light beam from the exit surface 21 of the optical board 20. As a result, the images and patterns can be readily displayed on the panel 60.

The front frame 70 includes four sidewalls 71 and the sidewall 71 facing the sidewall 51 of the middle frame 50 includes a plurality of tabs 711 and notches 712 arranged alternatively across the sidewall 71. In the current embodiment, there are four first tabs 711, and three first notches 712. It should be noted that, the number of the first tabs 711 and the first notches 712 are not limited to merely the embodiment disclosed herewith. It can be readily modified according to the field requirements. In addition, in the present invention, any one or two or three or four of the sidewalls 71 of the front frame 70, can be provided with the first tab 711 and the first notch 712.

In assembling, the first tab 711 is interlocked with the second notches 512, and the second tab 511 is interlocked with the first notch 712 so as to firmly interlock the front frame 70 and the middle frame 50. Accordingly, the liquid crystal panel 60 can be securely positioned. By this arrangement, the gap between the sidewall 71 of the front frame 70 and the middle frame 50, and this will help to realize the purpose of narrow-border of the liquid crystal display device 1. On the other hand, since the backboard 10 is still there to serve as a backbone, the overall mechanic strength is greatly enhanced. On the other hand, since the front frame 71 is in contact with the sidewall 11 of the backboard 10, it can serve as a heatsink so as to increase the heat dissipation performance.

Even embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

The invention claimed is:

1. A configurational structure of a front frame and a middle frame for use with a liquid crystal display device, including
a front frame including a sidewall with a first tab and a first notch alternatively arranged, the sidewall having a proximal end fixed to the front frame and an opposite distal end that is free and is not supported;
a middle frame arranged with respect to the front frame, and including a sidewall having a second notch corresponding to the first tab, and a second tab corresponding to the first notch, alternatively arranged; and
wherein the first tab comprises two opposite and substantially parallel side edges and the first notch is delimited between two opposite and substantially parallel walls and has an entry opening formed in the distal end of the sidewall of the front frame;

wherein the second tab comprises two opposite and substantially parallel side edges respectively corresponding to the walls of the first notch and the second notch is delimited between two opposite and substantially parallel walls respectively corresponding to the side edges of the first tabs; and wherein the first tab is received in and engages with the second notch, and the second tab is received through the entry opening into the first notch and engages with the first notch so as to securely interlock the front frame and the middle frame, wherein an outside surface of the first tab is substantially flush with an outside surface of the second tab.

2. The configurational structure as recited in claim 1, wherein a sidewall of the middle frame includes at least a retaining slot adapted to receive a third tab formed on a sidewall of a backboard of the liquid crystal display device so as to interlock the backboard and the middle frame.

3. The configurational structure as recited in claim 1, wherein the middle frame is made from plastic material.

4. The configurational structure as recited in claim 2, wherein the middle frame is made from plastic material.

5. A liquid crystal display device, including:
a backboard having a sidewall defining a receiving space;
an optical board disposed within the space;
at least a light source disposed adjacent to the optical board;
at least an optical film disposed onto an exit surface of the optical board;
a middle frame attached to the backboard so as to securely retain the optical board, the light source and the optical film within the receiving space, wherein a sidewall of the middle frame comprising a second notch and a second tab alternatively arranged;
a liquid crystal panel disposed onto the middle frame;
a front frame corresponding to the middle frame and including a sidewall with a first tab and a first notch alternatively arranged, the sidewall having a proximal end fixed to the front frame and an opposite distal end that is free and is not supported; and
wherein the first tab comprises two opposite and substantially parallel side edges and the first notch is delimited between two opposite and substantially parallel walls and has an entry opening formed in the distal end of the sidewall of the front frame;

wherein the second tab comprises two opposite and substantially parallel side edges respectively corresponding to the walls of the first notch and the second notch is delimited between two opposite and substantially parallel walls respectively corresponding to the side edges of the first tabs; and wherein the first tab is received in and engages with the second notch, and the second tab is received through the entry opening into the first notch and engages with the first notch so as to securely interlock the front frame and the middle frame thereby firmly positioning the liquid crystal panel, wherein an outside surface of the first tab is substantially flush with an outside surface of the second tab.

6. The liquid crystal display device as recited in claim 5, wherein a sidewall of the middle frame includes at least a retaining slot to receive a third tab formed on the sidewall of the backboard of the liquid crystal display device so as to interlock the backboard and the middle frame.

7. The liquid crystal display device as recited in claim 5, wherein the light source is a LED light strip.

8. The liquid crystal display device as recited in claim 6, wherein the light source is a LED light strip.

9. The liquid crystal display device as recited in claim 5, wherein the optical board is a waveguide.

10. The liquid crystal display device as recited in claim 5, wherein the optical board is a diffuser.

11. The liquid crystal display device as recited in claim 5, wherein the optical film is a diffuser.

12. The liquid crystal display device as recited in claim 5, wherein the optical film is an enhancer.

13. The liquid crystal display device as recited in claim 5, wherein the optical film is a prism.

14. The liquid crystal display device as recited in claim 5, wherein the middle frame is made from plastic material.

15. The liquid crystal display device as recited in claim 6, wherein the middle frame is made from plastic material.

* * * * *